(12) United States Patent
Zhao et al.

(10) Patent No.: US 11,082,658 B2
(45) Date of Patent: Aug. 3, 2021

(54) VIDEO TRANSMISSION METHOD WITH ADAPTIVE ADJUSTMENT BANDWIDTH AND SYSTEM THEREOF

(71) Applicant: REALTEK SEMICONDUCTOR CORP., Hsinchu (TW)

(72) Inventors: Yue-Cheng Zhao, Hsinchu (TW);
Cheng-Hua Wu, Hsinchu (TW);
Chia-Liang Wei, Hsinchu (TW);
Cheng-Hung Wu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 16/859,218

(22) Filed: Apr. 27, 2020

(65) Prior Publication Data

US 2021/0136322 A1 May 6, 2021

(30) Foreign Application Priority Data

Nov. 6, 2019 (CN) .......................... 201911077323.X (51) Int. Cl.
*H04N 7/12* (2006.01)
*H04N 7/01* (2006.01)
*H04N 21/4363* (2011.01)

(52) U.S. Cl.
CPC ................. *H04N 7/12* (2013.01); *H04N 7/01* (2013.01); *H04N 21/43635* (2013.01)

(58) Field of Classification Search
None
See application file for complete search history.

(56) References Cited

U.S. PATENT DOCUMENTS

2012/0191805 A1* 7/2012 Fee ....................... H04N 21/222
709/217
2015/0288919 A1* 10/2015 Labosco ................. G09G 5/008
348/445

* cited by examiner

*Primary Examiner* — Clifford Hilaire
(74) *Attorney, Agent, or Firm* — Birch, Stewart, Kolasch & Birch, LLP (57) ABSTRACT

A video transmission method and a system thereof are provided. The video transmission method includes: obtaining a first display timing setting parameter of one or more display devices. A total transmission bandwidth of the display device is calculated according to the first display timing setting parameter, and when the total transmission bandwidth is greater than a maximum transmission bandwidth between a video source and a conversion device, a second display timing setting parameter with a lower bandwidth is generated corresponding to the first display timing setting parameter. The video source transmits a video signal conforming to the second display timing setting parameter to the conversion device. The conversion device converts the second display timing setting parameter of the video signal back to the first display timing setting parameter. The video signal conforming to the first display timing setting parameter is transmitted to the corresponding display device.

16 Claims, 8 Drawing Sheets

VIDEO TRANSMISSION METHOD WITH ADAPTIVE ADJUSTMENT BANDWIDTH AND SYSTEM THEREOF

CROSS-REFERENCE TO RELATED APPLICATION

This non-provisional application claims priority under 35 U.S.C. § 119(a) to Patent Application No. 201911077323.X filed in China, P.R.C. on Nov. 6, 2019, the entire contents of which are hereby incorporated by reference.

BACKGROUND

Technical Field

The present invention relates to video transmission technologies, and in particular, to a video transmission method with an adaptive adjustment bandwidth and a system thereof.

Related Art

When a video source intends to transmit video data to a plurality of display devices, the video source is connected to the plurality of display devices through a conversion device such as a hub, a universal serial bus type-C dock (USB Type-C dock), or a signal converter, to display the video data on the display devices respectively.

Before transmitting the video data, the conversion device transmits bandwidth information obtained from the display device to the video source, the video source then allocates suitable video streaming to each display device according to the bandwidth in an entire topology. However, when the conversion device is connected to two 4K display devices at the same time, because a bandwidth required by the two 4K display devices to display the video data is already greater than a maximum bandwidth that can be borne by a display port (DP) interface between the video source and the conversion device, the conversion device can only transmit the video data of one 4K display device, and cannot enable the two 4K display devices to play the video data at the same time.

When a USB 3.0 is used for transmission between the video source and the conversion device, because a USB 3.0 signal and a DP signal are transmitted at the same time, the conversion device cannot enable one 4K display device to normally play the video signals. However, to resolve the problem, when selecting to transmit the USB 3.0 signal, the conversion device can only transmit the video signal less than 4K to the display device. When the conversion device does not transmit the USB 3.0 signal, the video source may transmit a 4K video signal together with a video signal whose bandwidth is less than 4K to the display device, resulting in poor user experience on the display device with the 4K ultra high definition.

SUMMARY

In view of this, the present invention provides a video transmission method with an adaptive adjustment bandwidth, used to transmit a video signal between a video source, a conversion device, and at least one display device. The video transmission method includes: obtaining a first display timing setting parameter of the at least one display device; calculating a total transmission bandwidth of the at least one display device according to the first display timing setting parameter, and comparing the total transmission bandwidth with a maximum transmission bandwidth between the video source and the conversion device; when the total transmission bandwidth is greater than the maximum transmission bandwidth, generating a second display timing setting parameter with a lower bandwidth corresponding to the first display timing setting parameter, and replacing the original first display timing setting parameter with the second display timing setting parameter to be transmitted to the video source; transmitting, by the video source, the video signal conforming to the second display timing setting parameter to the conversion device according to the second display timing setting parameter; converting, by the conversion device, the second display timing setting parameter of the video signal back to the first display timing setting parameter; and transmitting the video signal conforming to the first display timing setting parameter to the corresponding display device.

The present invention further provides a video transmission system with an adaptive adjustment bandwidth, including: at least one display device, a conversion device, and a video source. The at least one display device has a first display timing setting parameter respectively. The conversion device is electrically connected to the at least one display device to obtain the first display timing setting parameter of the at least one display device, where the conversion device calculates a total transmission bandwidth of the at least one display device according to the first display timing setting parameter, and compares the total transmission bandwidth with a maximum transmission bandwidth, and when the total transmission bandwidth is greater than the maximum transmission bandwidth, a second display timing setting parameter with a lower bandwidth is generated corresponding to the first display timing setting parameter. The video source is electrically connected to the conversion device, where the video source transmits the video signal conforming to the second display timing setting parameter to the conversion device according to the second display timing setting parameter, and the conversion device converts the second display timing setting parameter of the video signal back to the first display timing setting parameter, and transmits the video signal conforming to the first display timing setting parameter to the corresponding display device.

According to some embodiments, before the step of transmitting the video signal to the corresponding display device, the conversion device may further convert the video signal into a transmission interface format of the display device, and then transmit the converted video signal to the corresponding display device.

According to some embodiments, the first display timing setting parameter and the second display timing setting parameter are a part of extended display identification data (EDID).

According to some embodiments, the first display timing setting parameter further includes a first quantity of horizontal blank pixels and a first quantity of horizontal active pixels. The second display timing setting parameter further includes a second quantity of horizontal blank pixels and a second quantity of horizontal active pixels. The first quantity of horizontal blank pixels is greater than the second quantity of horizontal blank pixels, and the first quantity of horizontal active pixels is equal to the second quantity of horizontal active pixels.

According to some embodiments, the second quantity of horizontal blank pixels is greater than a minimum quantity of horizontal blank pixels necessary for the video source to transmit video data.

In conclusion, the present invention can modify the display timing setting parameter of the display device, so that the video source can successfully transmit the video signal with a reduced bandwidth to the conversion device, and the conversion device successfully transmit the restored video signal to the display device, so that the display device can display 4K ultra high definition pictures. Therefore, good experience on the display device with the 4K ultra high definition can be provided to users.

DETAILED DESCRIPTION

Figure 1:
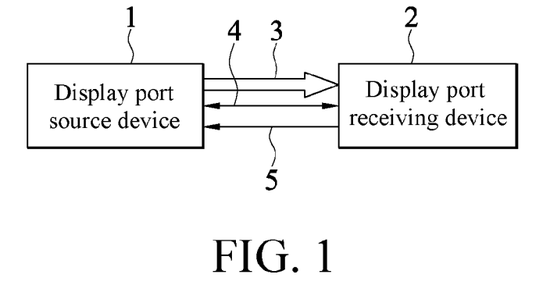
FIG. 1 is a schematic link diagram of a general display port (DP) interface.

FIG. 1 is a schematic link diagram of a general display port (DP) interface. Referring to FIG. 1, a DP source device 1 is connected to a DP receiving device 2 through three sets of channels. The three sets of channels include a primary channel 3, an accessary channel 4, and a detection channel 5. The primary channel 3 is used for transmitting a video signal of the DP source device 1 to a physical line of the DP receiving device 2, and has four pairs of differential signal lines. The four pairs of differential signal lines may determine to use several pairs of differential signal lines to transmit the video signal according to the communication of the accessary channel 4, and has three options such as one pair, two pairs and four pairs of differential signal lines. Different options have different total bandwidths. The accessary channel 4 is used for controlling and interacting information data between the DP source device 1 and the DP receiving device 2, and is a bidirectional data channel with a frequency of 1 MHz, and the accessary channel 4 has one pair of differential signal lines. The detection channel 5 is used for informing whether the DP source device 1 is connected to or removed from the DP receiving device 2, and the detection channel 5 is a single-ended signal line that needs a 3.3 V operating voltage.

For the primary channel 3, the link rate is a link rate on a single channel determined to be used by the DP source device 1 according to the attribute of the DP receiving device 2, namely, a transmission rate of one pair of differential signal lines, and has 1.62 G/Lane, 2.7 G/Lane, 5.4 G/Lane, and 8.1 G/Lane. As shown in a bandwidth correspondence table of the primary channel 3 in the following Table 1, a maximum bandwidth between the DP source device 1 and the DP receiving device 2 may be obtained by cooperating the link rate with a quantity of channels. In Table 1, when a transmission rate of 8.1 G/Lane is cooperated with four channels (four pairs of differential signal lines), a maximum bandwidth is 8.1 G (8100 Mbps)*4/10=3240 Mbps, and 3240 Mbps is converted into an actual pixel rate 3240 Mbps/3=1080 Mbps=1.08 Gbps. Therefore, the maximum bandwidth between the DP source device 1 and the DP receiving device 2 is 1.08 Gbps.

TABLE 1

| Link rate (Gbps) | Quantity of channels | Bandwidth (Mbps) |
|---|---|---|
| 8.1 | 1 | 810 |
|  | 2 | 1620 |
|  | 4 | 3240 |
| 5.4 | 1 | 540 |
|  | 2 | 1080 |
|  | 4 | 2160 |
| 2.7 | 1 | 270 |
|  | 2 | 540 |
|  | 4 | 1080 |
| 1.62 | 1 | 162 |
|  | 2 | 324 |
|  | 4 | 648 |

It may be learned from the foregoing content that when the DP source device 1 transmits two 4K video pictures at the four channels and the maximum bandwidth 8.1 Gbps, or when the DP source device 1 uses a universal serial bus type-C (USB Type-C) connection interface for transmission in a DP alternate mode, a USB 3.0 signal may be selectively transmitted together with the video signal. In this case, the USB 3.0 signal occupies two channels, only two channels are left for transmitting the video signal, and one 4K video picture may be transmitted at the same time. Therefore, in the prior art, in a multi-stream transport mode, neither can two 4K video pictures be transmitted at the same time, nor can the one 4K video picture be transmitted while the USB 3.0 signal is transmitted. On the contrary, according to the technology of the present invention, in the multi-stream transport mode, not only can the two 4K video pictures be transmitted to different display devices at the same time, but also the one 4K video picture can be transmitted while the USB 3.0 signal is transmitted.

Figure 2:
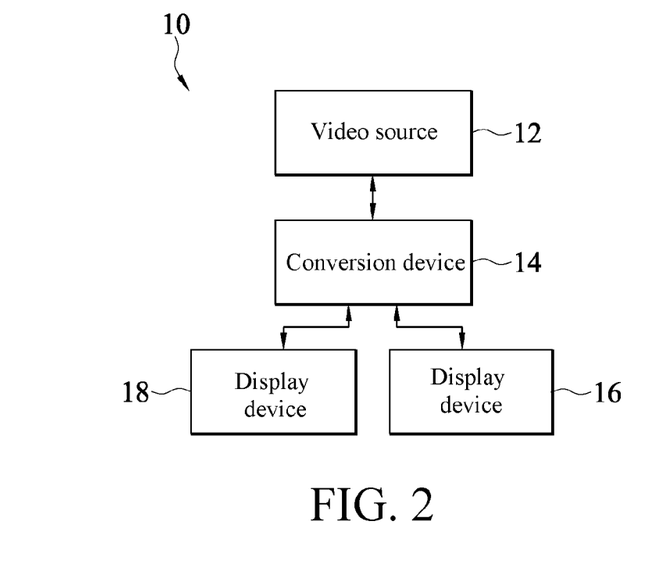
FIG. 2 is a schematic overview of an embodiment of a video transmission system according to the present invention.

FIG. 2 is a schematic overview of an embodiment of a video transmission system according to the present invention. Referring to FIG. 2, the video transmission system 10 includes a video source 12, a conversion device 14, and at least two display devices 16 and 18. Herein, the two display devices 16 and 18 are used as an example, but the quantity is not limited thereto. The two display devices 16 and 18 are electrically connected to the conversion device 14, and the conversion device 14 is electrically connected to the video source 12, so that two sets of video signals output by the video source 12 may be respectively transmitted to the corresponding display devices 16 and 18 through the conversion device 14.

Figure 3:
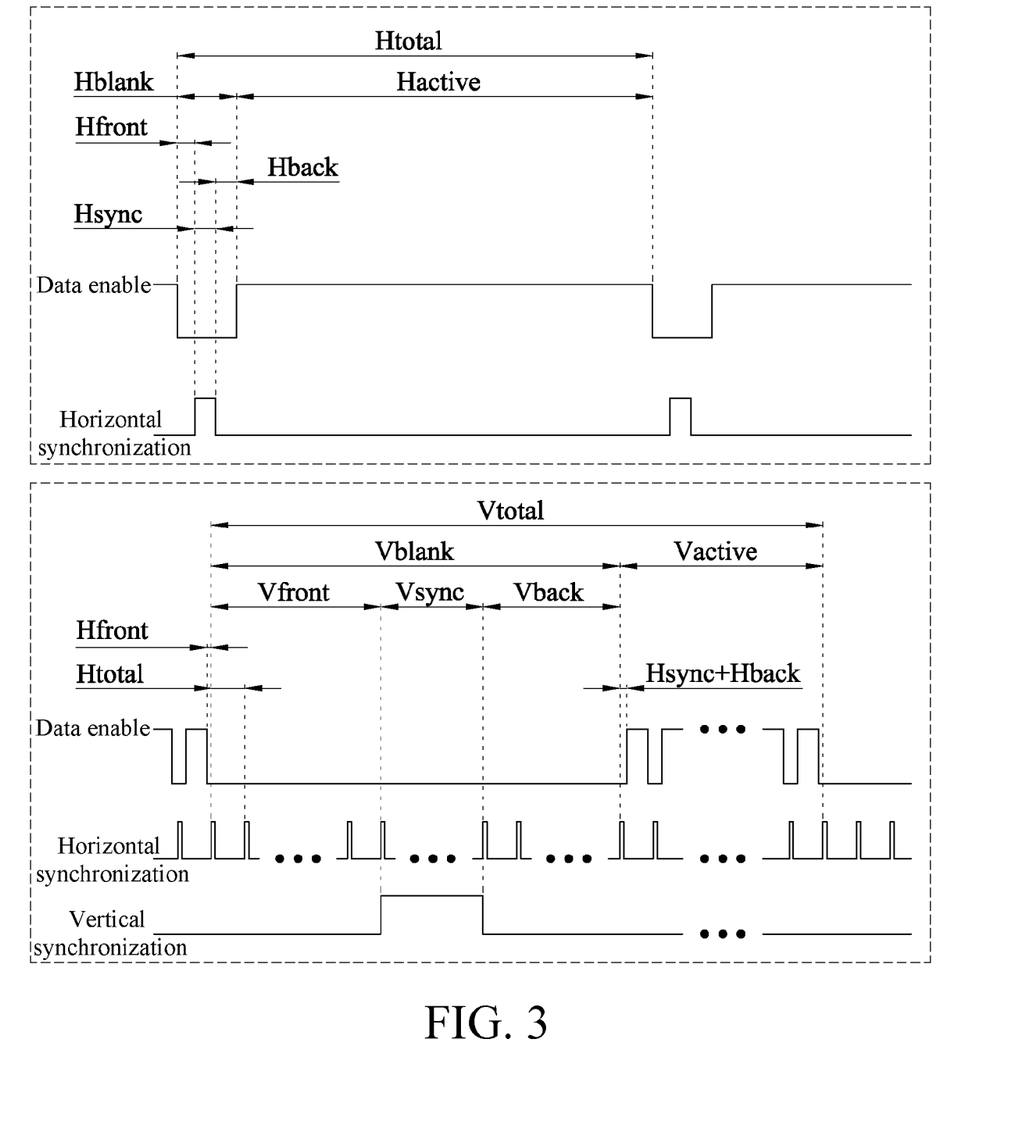
FIG. 3 is a schematic diagram of a display timing setting parameter of a display device according to the present invention.

In an embodiment, each of the display devices 16 and 18 includes its own display timing setting parameter. Referring to FIG. 3 together, the display timing setting parameter is a part of extended display identification data (EDID), and the EDID is stored in a memory (for example, PROM or EEPROM) built in the display devices 16 and 18. The display timing setting parameter includes a quantity of horizontal total pixels Htotal and a quantity of vertical total lines Vtotal. The quantity of horizontal total pixels Htotal includes a quantity of horizontal blank pixels Hblank and a quantity of horizontal active pixels Hactive. The quantity of horizontal blank pixels Hblank further includes horizontal front porch time Hfront, a horizontal sync width Hsync, and horizontal back porch time Hback. The quantity of vertical total lines Vtotal includes a quantity of vertical blank lines Vblank and a quantity of vertical active lines Vactive. The quantity of vertical blank lines Vblank further includes vertical front porch time Vfront, a vertical sync width Vsync and vertical back porch time Vback. Therefore, a bandwidth BW that may be transmitted by the display devices 16 and 18 is the product of the quantity of horizontal total pixels Htotal, the quantity of vertical total lines Vtotal and a frame rate F. A bandwidth calculation formula is expressed as: BW=Htotal (Hblank+HActive)*Vtotal (Vblank+Vactive) *frame rate F. Because the quantity of horizontal active pixels Hactive and the quantity of vertical active lines Vactive are fixed, only the quantity of horizontal blank pixels Hblank or the quantity of vertical blank lines Vblank can be changed if an interval size needs to be adjusted. Video data, for example, a secondary data packet (SDP), but not limited thereto, is transmitted in an interval between the quantity of horizontal blank pixels Hblank and the quantity of vertical blank lines Vblank. However, in fact, the bandwidth used for transmitting the video data is far less than total bandwidths of the quantity of horizontal blank pixels Hblank and the quantity of vertical blank lines Vblank. Therefore, the bandwidth requirements for picture transmission may be reduced by adjusting an interval size of the quantity of horizontal blank pixels Hblank.

Figure 4:
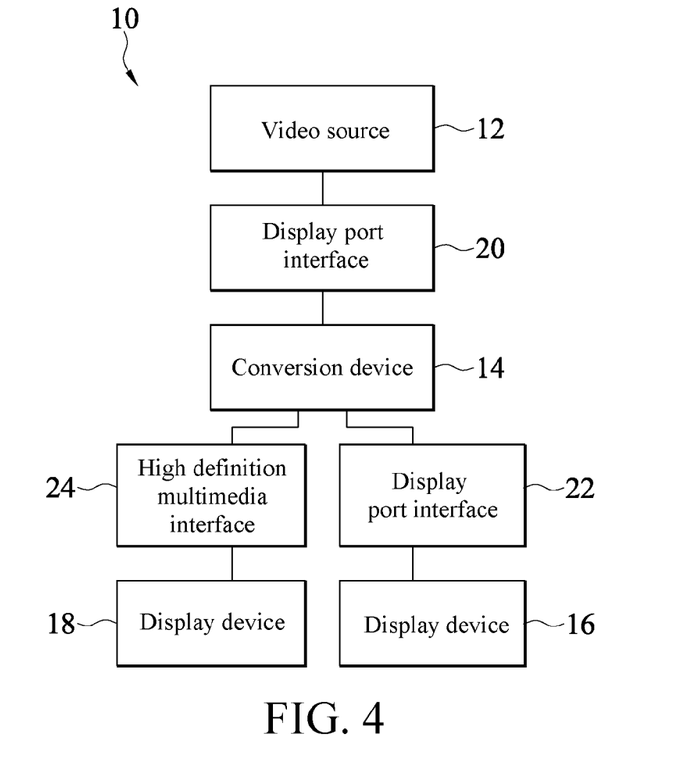
FIG. 4 is a schematic block diagram of an embodiment of a video transmission system according to the present invention.

In an embodiment, the video source 12 may be connected to the conversion device 14 through a DP interface or a USB Type-C connection interface. The conversion device 14 may be connected to the display devices 16 and 18 through a transmission interface format such as a DP interface, a high definition multimedia interface (HDMI) or a digital visual interface (DVI). FIG. 4 is a schematic block diagram of an embodiment of a video transmission system according to the present invention. Referring to FIG. 4, the video source 12 is connected to the conversion device 14 through a DP interface 20. The conversion device 14 is connected to the display device 16 through a DP interface 22, and connected to another display device 18 through a HDMI 24. Herein, the DP interface 22 and the HDMI 24 are used as an example, but not limited thereto.

In an embodiment, the video source 12 may be, but not limited to, a graphics adapter, an image producer, a mobile phone, a DVD player, a notebook computer, or the like. The conversion device 14 may be, but not limited to, a hub, a universal serial bus type-C dock (USB Type-C dock), a signal converter, or the like. The display devices 16 and 18 may be any suitable display, such as a liquid crystal display (LCD), an organic light-emitting diode (OLED), an active matrix organic light emitting display (AMOLED), or an electroluminescent display (ELD).

Figure 5:
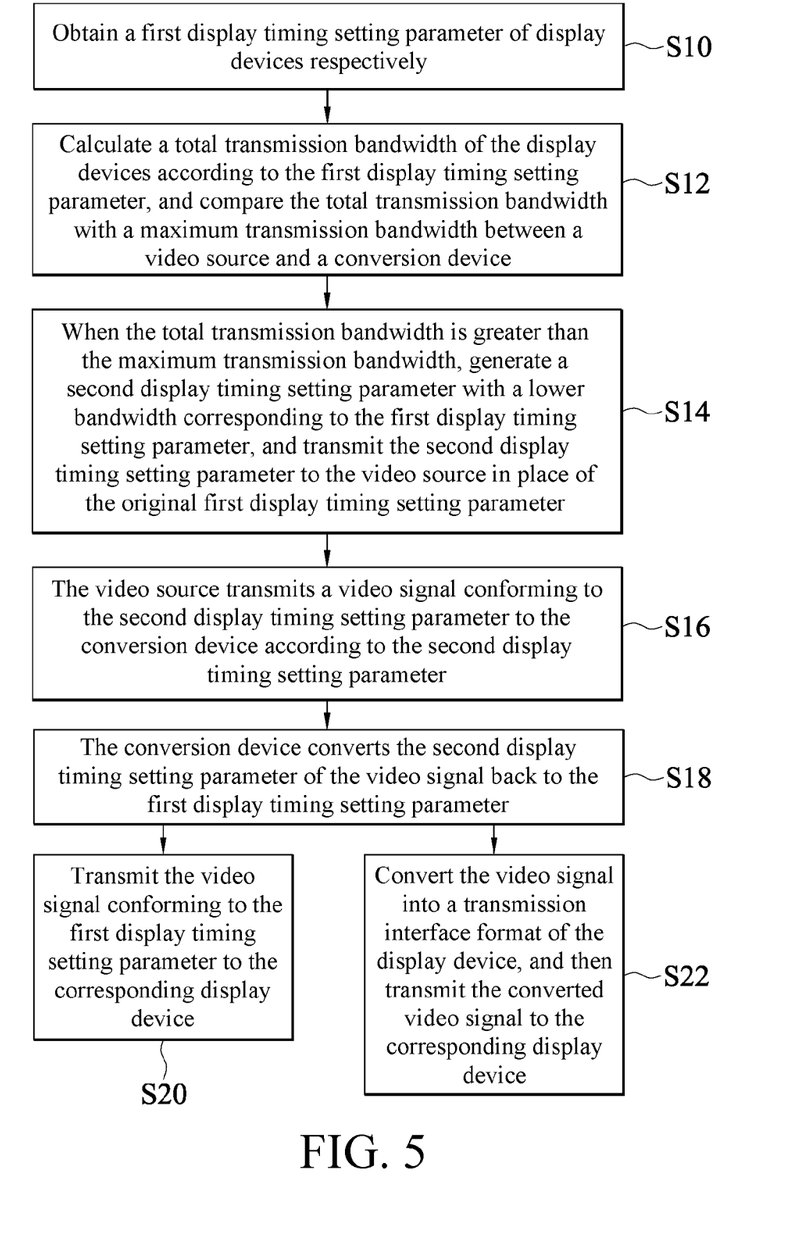
FIG. 5 is a schematic flowchart of an embodiment of a video transmission method according to the present invention.

FIG. 5 is a schematic flowchart of an embodiment of a video transmission method according to the present invention. Referring to FIG. 4 and FIG. 5, the video transmission method includes: as shown in step S10, the conversion device 14 obtains a first display timing setting parameter of the display devices 16 and 18 through the DP interface 22 and the HDMI 24 respectively. In an embodiment, the conversion device 14 obtains EDID of the display devices 16 and 18 respectively. Because the first display timing setting parameter is a part of the EDID, the conversion device 14 may obtain, from the EDID, the first display timing setting parameter required for subsequent calculation.

As shown in step S12, the conversion device 14 calculates a total transmission bandwidth of the display devices 16 and 18 according to the first display timing setting parameter, and compares the total transmission bandwidth with a maximum transmission bandwidth between the video source 12 and the conversion device 14. In the present embodiment, the maximum transmission bandwidth is a maximum transmission bandwidth of the DP interface 20.

As shown in step S14, when the total transmission bandwidth is greater than the maximum transmission bandwidth, the conversion device 14 generates a second display timing setting parameter with a lower bandwidth corresponding to the first display timing setting parameter, replaces the first display timing setting parameter originally obtained from the display devices 16 and 18 with the second display timing setting parameter, and transmits the second display timing setting parameter to the video source 12 through the DP interface 20. In an embodiment, because the second display timing setting parameter is also a part of the EDID, the conversion device 14 replaces the first display timing setting parameter originally obtained from the display devices 16 and 18 with the second display timing setting parameter, and combines other information in the original EDID together to be transmitted to the video source 12. In other words, the conversion device 14 transmits the EDID together with the second display timing setting parameter to the video source 12. The first display timing setting parameter further includes a first quantity of horizontal blank pixels and a first quantity of horizontal active pixels. The second display timing setting parameter further includes a second quantity of horizontal blank pixels and a second quantity of horizontal active pixels. The first quantity of horizontal blank pixels is greater than the second quantity of horizontal blank pixels, and the first quantity of horizontal active pixels is equal to the second quantity of horizontal active pixels. In this case, because the second quantity of horizontal blank pixels is less than the first quantity of horizontal blank pixels, it can be learned from the foregoing bandwidth calculation formula that the bandwidth of the second display timing setting parameter is less than the bandwidth of the first display timing setting parameter. Moreover, the second quantity of horizontal blank pixels needs to be greater than a minimum quantity of horizontal blank pixels necessary for the video source 12 to transmit video data, and the minimum quantity of horizontal blank pixels may ensure that a space size sufficient to transmit the video data exists in the second quantity of horizontal blank pixels.

As shown in step S16, after receiving the second display timing setting parameter from the conversion device 14, the video source 12 transmits the video signal conforming to the second display timing setting parameter to the conversion device 14 through the DP interface 20 according to the second display timing setting parameter.

Because the bandwidth of the video signal conforming to the second display timing setting parameter is relatively small, the video signal may be successfully transmitted to the conversion device 14 through the DP interface 20. As shown in step S18, after receiving the video signal, the conversion device 14 converts the second display timing setting parameter of the video signal back to the original first display timing setting parameter corresponding to the display devices 16 and 18 respectively.

Then, because the DP interface 22 used between the conversion device 14 and the display device 16 and the DP interface 20 are in the same transmission format, as shown in step S20, the conversion device 14 may directly transmit the video signal conforming to the first display timing setting parameter to the corresponding display device 16 through the DP interface 22. On the other hand, because the HDMI 24 used between the conversion device 14 and the display device 18 and the DP interface 20 are in different transmission formats, as shown in step S22, the conversion device 14 first converts the video signal conforming to the first display timing setting parameter into a transmission interface format of the display device 18, namely, a transmission format of the HDMI 24. Then the conversion device 14 transmits the converted video signal to the corresponding display device 18 through the HDMI 24.

In another embodiment, in step S12, when the conversion device 14 compares the total transmission bandwidth of the display devices 16 and 18 with the maximum transmission bandwidth between the video source 12 and the conversion device 14, the first display timing setting parameter does not need to be converted if the total transmission bandwidth is less than the maximum transmission bandwidth. The conversion device 14 directly transmits the first display timing setting parameter to the video source 12 through the DP interface 20, and the video source 12 transmits the video signal conforming to the first display timing setting parameter to the conversion device 14 through the DP interface 20 according to the first display timing setting parameter. Then, as shown in step S20 or S22, the conversion device 14 transmits the video signal conforming to the first display timing setting parameter to the corresponding display devices 16 and 18 through the DP interface 22 and the HDMI 24 respectively.

Figure 6A:
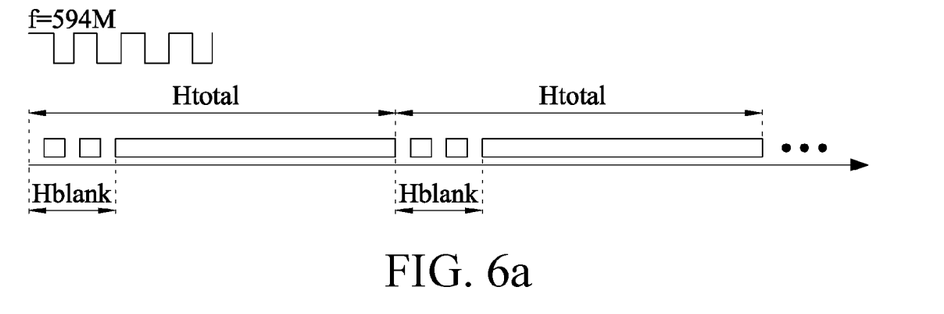
FIG. 6a is a schematic diagram of data transmission of a frequency timeline without the present invention.
Figure 6B:
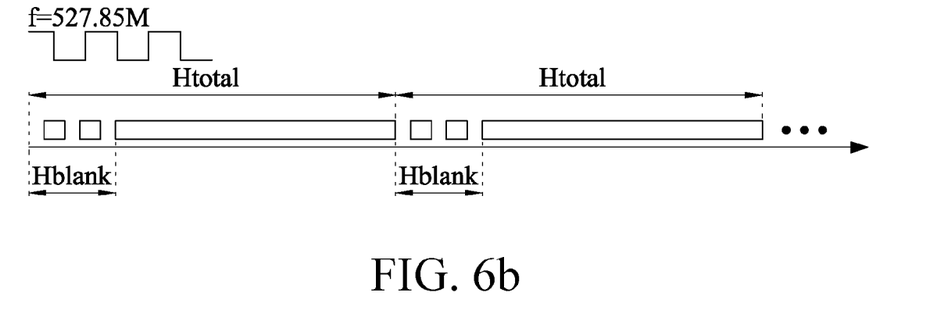
FIG. 6b is a schematic diagram of data transmission of a frequency timeline with the present invention.
Figure 7A:
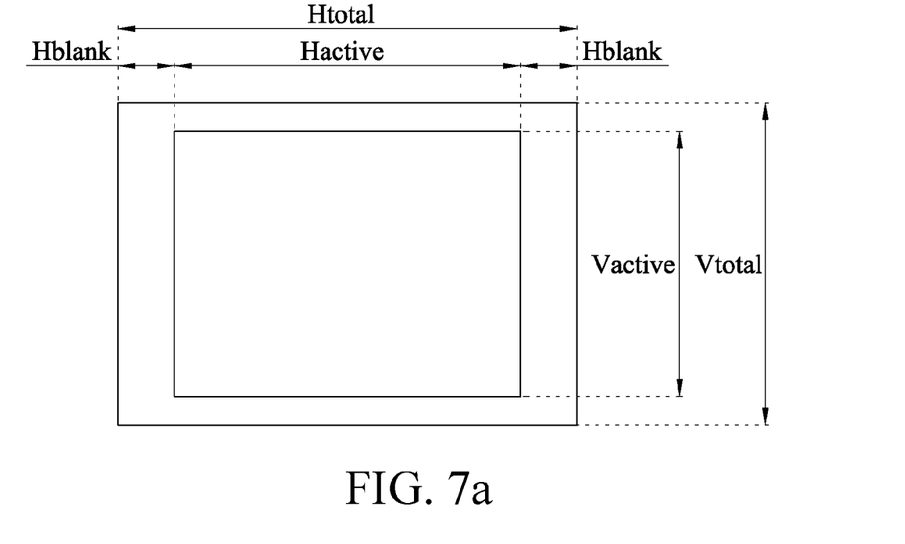
FIG. 7a is a schematic diagram of a picture output by a video source when the present invention is not used.
Figure 7B:
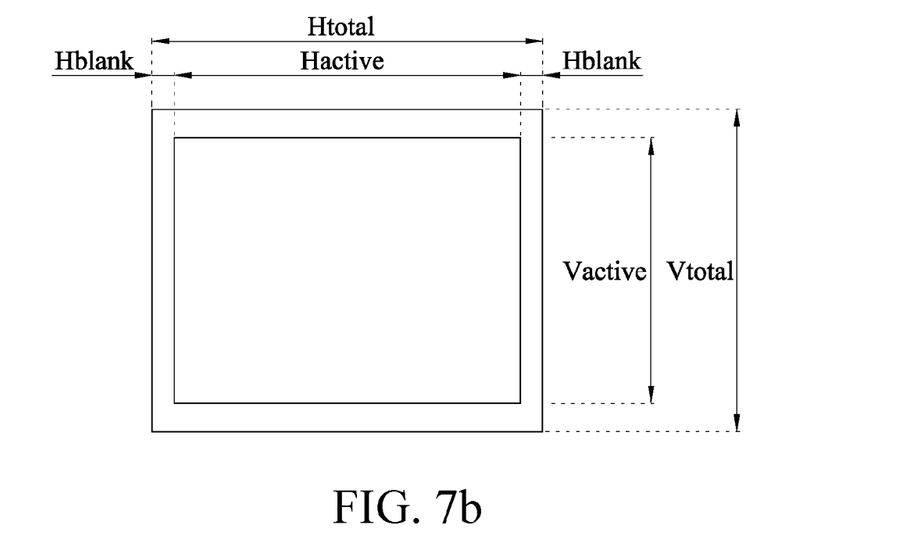
FIG. 7b is a schematic diagram of a picture output by a video source when the present invention is used.

FIG. 6a is a schematic diagram of data transmission of a frequency timeline without the present invention. FIG. 6b is a schematic diagram of data transmission of a frequency timeline with the present invention. FIG. 7a is a schematic diagram of a picture output by a video source when the present invention is not used. FIG. 7b is a schematic diagram of a picture output by a video source when the present invention is used. Referring to FIG. 4, FIG. 6a, FIG. 6b, FIG. 7a, and FIG. 7b, when the technology of the present invention is not used, as shown in FIG. 6a and FIG. 7a, a quantity of horizontal total pixels Htotal is 4400 pixels, a quantity of vertical total lines Vtotal is 2250 lines, a quantity of horizontal blank pixels Hblank is 560 pixels, a quantity of horizontal active pixels Hactive is 3840 pixels, a quantity of vertical active lines Vactive is 2160 lines, and a frame rate is 60 Hz. In this case, a bandwidth of a picture output by the video source 12 is 4400*2250*60=594 Mbps (frequency f=594 MHz), and the bandwidth is the same as the picture bandwidth of the display device 16 or 18. However, after the technology of the present invention is used, because the conversion device 14 converts the first display timing setting parameter into the corresponding second display timing setting parameter with the lower bandwidth, the quantity of horizontal blank pixels Hblank is reduced. As shown in FIG. 6b and FIG. 7b, the quantity of horizontal blank pixels Hblank is reduced to 70 pixels, the quantity of horizontal active pixels Hactive is still 3840 pixels, the quantity of vertical active lines Vactive is 2160 lines, and the frame rate is 60 Hz. Therefore, the quantity of horizontal total pixels Htotal becomes 3910 pixels, and the quantity of vertical total lines Vtotal is still 2250 lines. In this case, a bandwidth of a picture output by the video source 12 is 3910*2250*60=527.85 Mbps (frequency f=527.85 MHz), and the bandwidth may be less than a picture bandwidth specification of the display device 16 or 18, resulting in a total saving in the bandwidth 594-527.85=66.15 Mbps.

Figure 8:
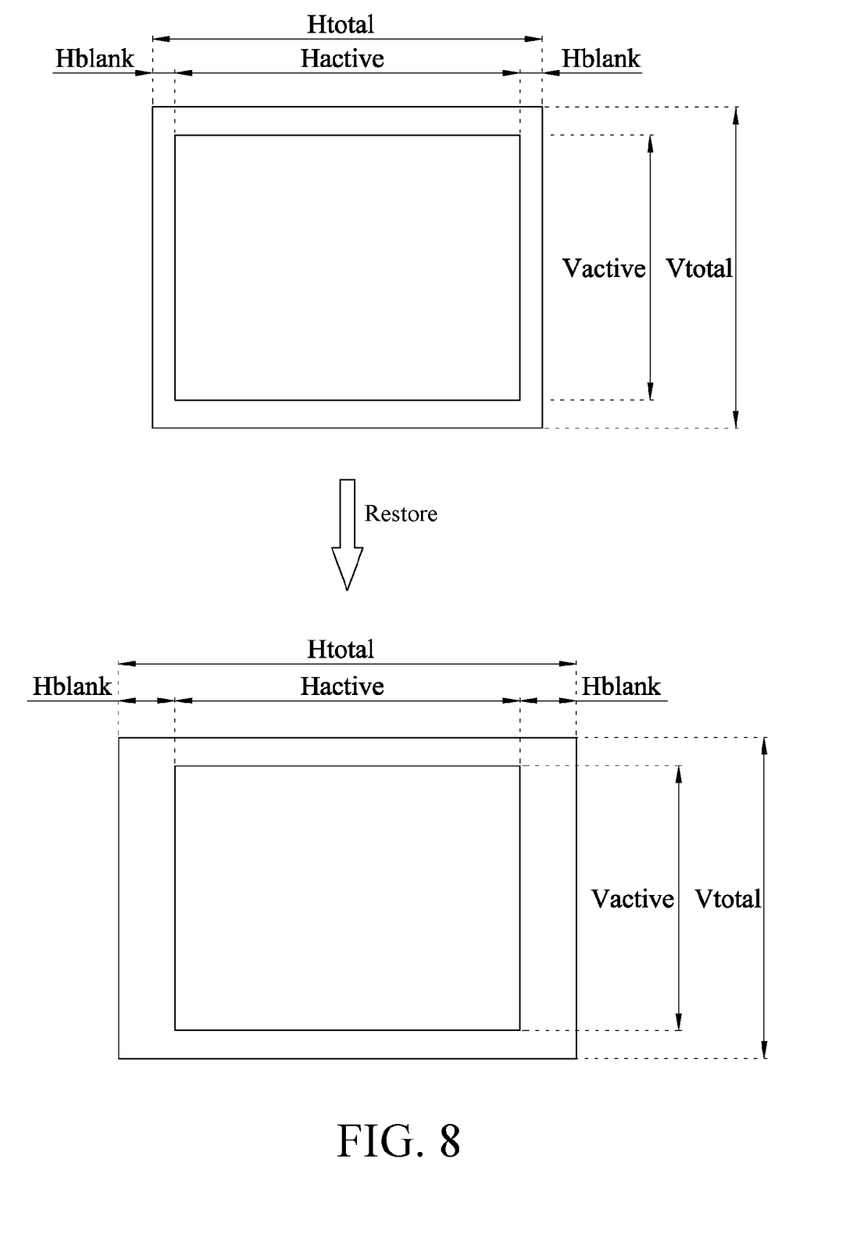
FIG. 8 is a schematic diagram of a picture showing a conversion device restoring a second display timing setting parameter to a first display timing setting parameter according to the present invention.

FIG. 8 is a schematic diagram of a picture showing a conversion device restoring a second display timing setting parameter to a first display timing setting parameter according to the present invention. Referring to FIG. 4 and FIG. 8 together, in a video transmission system 10, because the bandwidth of the picture output by the video source 12 is 3910*2250*60=527.85 Mbps, after receiving the picture, the conversion device 14 first restores the picture conforming to the second display timing setting parameter to the picture conforming to the first display timing setting parameter (the quantity of horizontal blank pixels Hblank is restored from 70 pixels to 560 pixels). Therefore, the conversion device 14 restores the picture whose bandwidth is 3910*2250*60=527.85 Mbps to the picture whose bandwidth is 594 Mbps, and then transmits the restored picture to the corresponding display device 16 and 18, to display an ultra high definition picture.

Referring to FIG. 4, when a picture display specification of the display device 16 is 4 K-60 533 M, it indicates that the frame rate is 60 Hz and the bandwidth is 533 Mbps. When a picture display specification of another display device 18 is 4 K-60 594 M, it indicates that the frame rate is 60 Hz and the bandwidth is 594 Mbps. In the prior art without using the technology of the present invention, a total bandwidth required for transmitting two pictures (video signals) at the same time by the video source 12 is 533+594=1127 Mbps, which is greater than the maximum transmission bandwidth 1.08 G of the DP interface 20 between the video source 12 and the conversion device 14, and consequently, the two pictures cannot be transmitted to the conversion device 14 at the same time, and only one of the pictures can be transmitted. After the technology of the present invention is used, because the conversion device 14 correspondingly modifies the display timing setting parameter and transmits the modified display timing setting parameter to the video source 12, the picture display specification of the two pictures (the video signal) output by the video source 12 is converted into 4 K-60 519 M (corresponding to the display device 16) and 4 K-60 527 M (corresponding to the display device 18). In this case, a total bandwidth required by the video source 12 to transmit the two pictures at the same time is 519+527=1046 Mbps, which is less than the maximum transmission bandwidth 1.08 G of the DP interface 20 between the video source 12 and the conversion device 14. When the video source 12 may transmit the two pictures to the conversion device 14 at the same time, the conversion device 14 restores the two pictures to the original picture display specification (restores 4 K-60 519 M to 4 K-60 533 M, and restores 4 K-60 527 M to 4 K-60 594 M) of the display devices 16 and 18, and then the conversion device 14 may transmit the two pictures to the display devices 16 and 18 through the DP interface 22 and the HDMI 24 respectively, so that the display devices 16 and 18 may display the pictures at the same time.

Therefore, when the conversion device 14 is connected to two 4K display devices 16 and 18 at the same time, and the DP interface 20 is used between the video source 12 and the conversion device 14, the present invention can enable the two 4K display devices 16 and 18 to normally play the video data at the same time.

Figure 9:
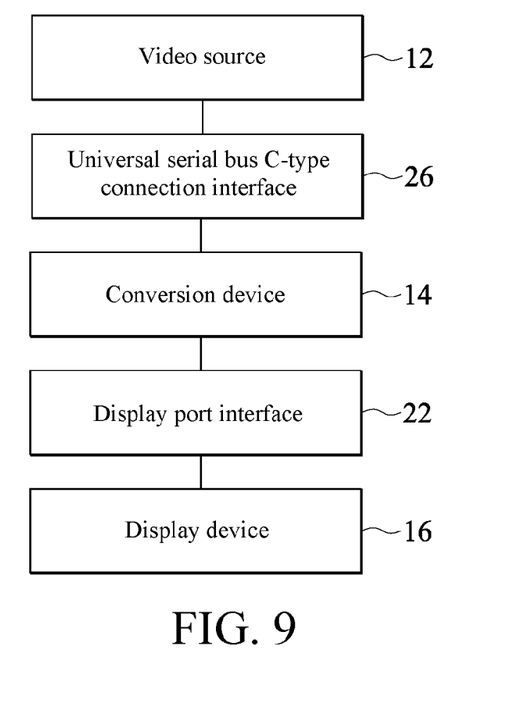
FIG. 9 is a schematic block diagram of another embodiment of a video transmission system according to the present invention.

In another embodiment, FIG. 9 is a schematic block diagram of another embodiment of a video transmission system according to the present invention. Referring to FIG. 9, the video transmission system 10 includes a video source 12, a conversion device 14, and a display device 16. The video source 12 is connected to the conversion device 14 through a USB C-type connection interface 26. The conversion device 14 is connected to the display device 16 through a DP interface 22. Herein, the DP interface 22 is used as an example, but not limited thereto. The conversion device 14 may be alternatively connected to the display device 16 through an HDMI. When being transmitted in a DP replacement mode through the USB C-type connection interface 26, the video source 12 transmits a USB 3.0 signal and a video signal together to the conversion device 14. Specifically, the conversion device 14 obtains a first display timing setting parameter of the display device 16. The conversion device 14 receives and calculates a total transmission bandwidth of the display devices 16 according to the first display timing setting parameter, and compares the total transmission bandwidth with a maximum transmission bandwidth between the video source 12 and the conversion device 14. In this case, the maximum transmission bandwidth is a transmission bandwidth of a remaining transmission channel after the transmission channel transmitting the USB 3.0 signal is deducted. When the total transmission bandwidth is greater than the maximum transmission bandwidth, a second display timing setting parameter with a lower bandwidth is generated corresponding to the first display timing setting parameter and transmitted to the video source 12 in place of the original first display timing setting parameter. The video source 12 transmits the USB 3.0 signal to the conversion device 14 through the USB C-type connection interface 26, and the video source 12 transmits the video signal conforming to the second display timing setting parameter to the conversion device 14 according to the second display timing setting parameter. The conversion device 14 converts the second display timing setting parameter of the video signal back to the first display timing setting parameter, and transmits the video signal conforming to the first display timing setting parameter to the corresponding display device 16. A difference between the present embodiment and the foregoing embodiments is only in the quantity of display devices. Therefore, for the detailed content and principle, reference may be made to the foregoing descriptions, and details are not described herein again. In addition, after receiving the USB 3.0 signal, the conversion device 14 may further transmit the USB 3.0 signal to any external device. Because this is not the focus of the present invention, no more descriptions are added.

Therefore, when the video source 12 uses the USB C-type connection interface 26, the USB 3.0 signal and the video signal (DP signal) may be transmitted to the conversion device 14 at the same time, so that a 4K display device 16 can normally play the video signal.

In conclusion, the present invention can modify the display timing setting parameter of the display device, so that the video source can successfully transmit the video signal (picture) with a reduced bandwidth to the conversion device, and the conversion device successfully transmits the restored video signal to the corresponding display device, so that the display device can display 4K ultra high definition pictures at the same time. Therefore, good experience on the display device with the 4K ultra high definition can be provided to users. Moreover, in the present invention, no hardware device needs to be additionally added, and the foregoing video transmission method can be implemented by only modifying the firmware inside a chip of the conversion device.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A video transmission method with an adaptive adjustment bandwidth, used to transmit a video signal between a video source, a conversion device, and at least one display device, the video transmission method comprises:

obtaining a first display timing setting parameter of the at least one display device; calculating a total transmission bandwidth of the at least one display device according to the first display timing setting parameter, and comparing the total transmission bandwidth with a maximum transmission bandwidth between the video source and the conversion device;

when the total transmission bandwidth is greater than the maximum transmission bandwidth, generating a second display timing setting parameter with a lower bandwidth corresponding to the first display timing setting parameter;

transmitting, by the video source, a video signal conforming to the second display timing setting parameter to the conversion device according to the second display timing setting parameter; converting, by the conversion device, the second display timing setting parameter of the video signal back to the first display timing setting parameter; and transmitting a video signal conforming to the first display timing setting parameter to the corresponding display device.

2. The video transmission method according to claim 1, wherein before the step of transmitting the video signal to the corresponding display device, the method further comprises: converting the video signal into a transmission interface format of the display device, and then transmitting the converted video signal to the corresponding display device.

3. The video transmission method according to claim 1, wherein the first display timing setting parameter is a part of extended display identification data (EDID).

4. The video transmission method according to claim 1, wherein the second display timing setting parameter is a part of EDID.

5. The video transmission method according to claim 1, wherein the first display timing setting parameter further comprises a first quantity of horizontal blank pixels and a first quantity of horizontal active pixels, the second display timing setting parameter further comprises a second quantity of horizontal blank pixels and a second quantity of horizontal active pixels, the first quantity of horizontal blank pixels is greater than the second quantity of horizontal blank pixels, and the first quantity of horizontal active pixels is equal to the second quantity of horizontal active pixels.

6. The video transmission method according to claim 5, wherein the second quantity of horizontal blank pixels is greater than a minimum quantity of horizontal blank pixels necessary for the video source to transmit video data.

7. The video transmission method according to claim 6, wherein the video data is a secondary data packet (SDP).

8. A video transmission system with an adaptive adjustment bandwidth, comprising:
   at least one display device, having a first display timing setting parameter;
   a conversion device, electrically connected to the at least one display device to obtain the first display timing setting parameter of the at least one display device, wherein the conversion device calculates a total transmission bandwidth of the at least one display device according to the first display timing setting parameter, and compares the total transmission bandwidth with a maximum transmission bandwidth, and when the total transmission bandwidth is greater than the maximum transmission bandwidth, a second display timing setting parameter with a lower bandwidth is generated corresponding to the first display timing setting parameter; and
   a video source, electrically connected to the conversion device, wherein the maximum transmission bandwidth exists between the video source and the conversion device, the video source transmits a video signal conforming to the second display timing setting parameter to the conversion device according to the second display timing setting parameter, and the conversion device converts the second display timing setting parameter of the video signal back to the first display timing setting parameter, and transmits a video signal conforming to the first display timing setting parameter to the corresponding display device.

9. The video transmission system according to claim 8, wherein the first display timing setting parameter is a part of extended display identification data (EDID).

10. The video transmission system according to claim 8, wherein the second display timing setting parameter is a part of EDID.

11. The video transmission system according to claim 8, wherein the first display timing setting parameter further comprises a first quantity of horizontal blank pixels and a first quantity of horizontal active pixels, the second display timing setting parameter further comprises a second quantity of horizontal blank pixels and a second quantity of horizontal active pixels, the first quantity of horizontal blank pixels is greater than the second quantity of horizontal blank pixels, and the first quantity of horizontal active pixels is equal to the second quantity of horizontal active pixels.

12. The video transmission system according to claim 11, wherein the second quantity of horizontal blank pixels is greater than a minimum quantity of horizontal blank pixels necessary for the video source to transmit video data.

13. The video transmission system according to claim 12, wherein the video data is a secondary data packet (SDP).

14. The video transmission system according to claim 8, wherein the video source is connected to the conversion device through a display port (DP) interface or a universal serial bus type-C connection interface.

15. The video transmission system according to claim 14, wherein the conversion device is connected to the at least two display devices through a transmission interface format of a DP interface, a high definition multimedia interface (HDMI) or a digital visual interface (DVI).

16. The video transmission system according to claim 15, wherein when the conversion device is connected to the at least one display device through the HDMI or the DVI, the conversion device first converts the video signal conforming to the first display timing setting parameter into the transmission interface format of the at least one display device, and then transmits the converted video signal to the corresponding display device.

* * * * *